J. W. WILFORD & C. C. WOOD.
DISTRIBUTING TUBE FOR CENTRIFUGAL SEPARATORS.
APPLICATION FILED JAN. 17, 1910. RENEWED SEPT. 7, 1911.

1,096,000.

Patented May 5, 1914.

WITNESSES:
Zoa Haner
Edward Cahill

INVENTORS
James W. Wilford
Clark C. Wood
BY Clark C. Wood
ATTORNEY

UNITED STATES PATENT OFFICE.

JAMES W. WILFORD AND CLARK C. WOOD, OF LANSING, MICHIGAN, ASSIGNORS TO OMEGA SEPARATOR COMPANY, OF LANSING, MICHIGAN, A CORPORATION OF MICHIGAN.

DISTRIBUTING-TUBE FOR CENTRIFUGAL SEPARATORS.

1,096,000.            Specification of Letters Patent.        Patented May 5, 1914.

Application filed January 17, 1910, Serial No. 538,375. Renewed September 7, 1911. Serial No. 648,162.

*To all whom it may concern:*

Be it known that we, JAMES W. WILFORD and CLARK C. WOOD, citizens of the United States, residing at Lansing, in the county of Ingham and State of Michigan, have invented certain new and useful Improvements in Distributing-Tubes for Centrifugal Separators, of which the following is a specification.

This invention relates to distributing tubes for centrifugal cream separators, and more particularly to that type of distributing tubes in which projections, wings or blades, are employed to engage with the descending stream of milk.

The object of the present invention is the provision of a distributing tube of this character, of such construction as to secure a more even distribution of the incoming milk to the entire skimming surface of the bowl than has been possible in the distribution tubes heretofore in use.

Other objects of the invention will be apparent from the detailed description hereinafter, when read in connection with the accompanying drawings forming a part hereof, wherein a convenient embodiment of the invention is illustrated, and wherein like characters refer to similar parts in the several views.

Figure 2:
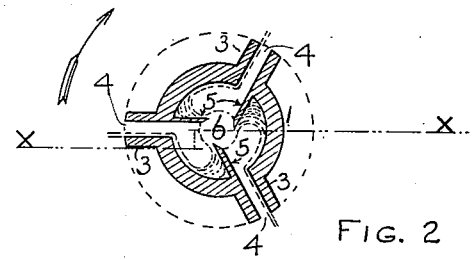
Figure 1:
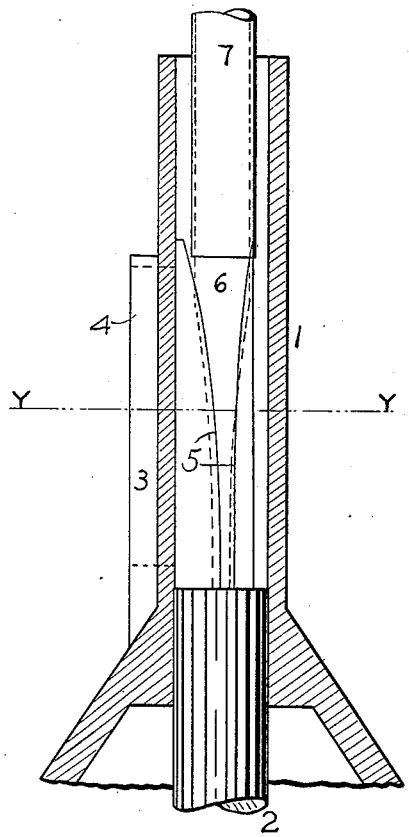
Figure 3:
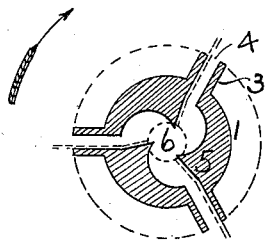
Figure 4:
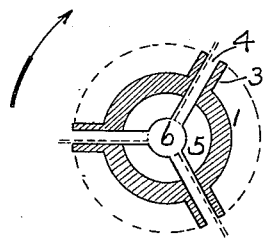

In the drawings:—Figure 1 is a vertical section on the line x—x of Fig. 2 of a distributing tube constructed in accordance with the present invention; Fig. 2 is a horizontal section on the line y—y of Fig. 1; Figs. 3 and 4 are detail views showing modifications of the device.

Referring now more particularly to the drawings, 1 is a distributing tube which may be of any ordinary shape or design which is provided with a plurality of slits 4, which extend through the wall of the distributing tube for the purpose of distributing the milk to the skimming surface of the separator, said slits conveniently extending longitudinally of the tube. Wings 3 may also be provided which extend outwardly from the outer wall of the distributing tube and abut against the inner edges of the plates constituting the skimming surface, the slits 4 passing through these wings. This, however, is a construction well known in this art and constitutes no part of the present invention.

Projecting downwardly into the upper end of the distributing tube 1 is a feed tube 7, which is smaller in diameter than the distributing tube 1, and the lower end of which terminates adjacent the upper ends of the slits 4 in the distributing tube 1. Projecting from the interior of the distributing tube 1 are a plurality of blades 5, such blades in the embodiment of the invention illustrated, being shown as extending longitudinally of the distributing tube 1. The upper extremities of the blades 5 are positioned outside of the tube 7 and conveniently extend above the lower end of said tube and the blades gradually increase in width from the tops to the lower portions thereof, the lower portions of the blades being of such width that they come nearly or quite to the center of the distributing tube. By reason of the tapered formation of the blades just described, it will be seen that when the bowl is rotated at a high speed, a thin uniform shaving or film is removed from the stream of milk which descends from the feed tube 7 and the body of such stream is not disturbed to any material extent but will continue to descend in a solid column until it engages the blades. The shattering of the descending stream of milk at its upper end is absolutely prevented by this construction of the blades 5, as the upper ends of such blades are positioned outside of the descending stream of milk. In the form of the invention illustrated, the edges of the blades 5 are sharpened, and while this is a convenient way of forming the blades, it is not absolutely essential to the operation of the device, as the blades may be provided with any form of outer edge which will, as the bowl is revolved at a high speed, enable the removing of a thin shaving or film of milk from the descending stream without shattering the stream. By reason of the employment of blades of a character which will enable a thin film or shaving to be removed from the descending stream of milk, it is obvious that the breaking up of the fat particles, foaming, and other objections incident to the operation of ordinary bowls, are to a very large extent done away with. As shown in Fig. 1, the inner edges of the blades 5 are not straight, but are curved, the curvature of the blades being such that the shaving cut from the descending stream of milk, will increase in thickness as the circumference of the descending stream diminishes, so that the quantity of milk, removed from the descending stream and directed to the inner wall of the distributing tube shall be substantially the same at every part of the length of the slits 4, thus supplying equal quantities to each of the blades constituting the skimming surface of the bowl.

In the form of the invention illustrated in the drawings, the blades 5 are attached to the inner wall of the tube, parallel to the slits 4 and immediately in advance of said slits in the line of the direction of the revolution of the bowl and inclining slightly forward in the direction of the revolution of the bowl. By this construction, the shaving or film of milk removed from the outer surface of the descending stream will be drawn outward in the form of a thin, smooth film along the forward sides of the wings 5, piling up in the angles formed between the inner wall of the distributing tube and the blades 5 until it overflows the edges of the slits 4 next in advance of the blades and passes outward through the slits in the form of a thin film which will be of substantial uniform thickness from top to the bottom of the slit. By this piling up of the liquid, in the angles between the inner wall of the distributing tube and blades 5, we materially assist the evenness of the distribution of the liquid, since it is evident that the inertia of the liquid flowing outward and striking against this angle, will tend to bring all parts of the column of liquid thus formed to the same level, thus making the film of liquid flowing outward through the passages 4, of perfectly uniform thickness.

In some instance perfect uniformity of thickness of the escaping film of liquid may not be desired. For example, it may be desirable to make the films slightly thicker at the top. In that instance, a structure such as shown in Fig. 4 may be employed, in which the blades instead of being located on the front side of the slits 4, are located on the rear side. By this means, the film or shaving of liquid cut off by the blades, will at once pass out through the slits as shown in Fig. 4, without piling up, so that by changing the curve of the inner edge of the blades so as to cut a thicker shaving, a large portion of the liquid can be directed outward at any desired point. In this way it is evident that by changing the form of the curve of the free edges of the blades 5, the distribution of the milk to the skimming surface of the bowl may be provided in almost any manner desired. For example, by removing a thicker shaving near the top, an increased quantity will be directed outward through the upper parts of the slits, or by making this shaving thinner at the top, and thicker at some other point, less will be directed at the top and more at the point of increased thickness, thus placing the distribution of the milk in the bowl completely under control.

While the blades 5 in the form of the invention illustrated, are shown as extending parallel to the slits 4, in the distributing tube, it is obvious that they may be otherwise disposed, the essential thing being that such blades are so formed as to remove a film of milk from the descending milk stream without shattering the same at the point where it strikes the blades.

While a convenient embodiment of the invention is illustrated in the accompanying drawings, it will be obvious that many changes may be made to the form and construction therein shown without departing from the spirit and scope of the invention as defined in the appended claims.

We claim as our invention and desire to secure by Letters Patent:

1. In combination with a distributing tube for centrifugal separators, said tube being provided with an outlet opening in the side thereof, a longitudinally extending distributing blade projecting into the interior of said tube from the wall thereof so as to remove upon rotation of the distributing tube a film of liquid from the exterior of the descending stream of milk, the free edge of said blade being formed with a knife edge.

2. In combination with a distributing tube for centrifugal separators having a discharge opening in the side thereof, a distributing blade extending longitudinally of the interior of said tube and inwardly from the wall thereof, said blade increasing in width from its top to its bottom.

3. In combination with a distributing tube for centrifugal separators having a distributing opening in the side, a longitudinally extending thin distributing blade projecting into the interior of said tube from the wall thereof, said blade increasing in width from its top to its bottom and provided with an inclined sharpened free edge.

4. In combination with a distributing tube for centrifugal separators having an outlet opening in the side thereof, a milk admission tube extending downwardly into the upper portion of said distributing tube, a longitudinally extending distributing blade projecting into the interior of said distributing tube from the wall thereof, said blade increasing in width from its top to its bottom and the upper end thereof being positioned above the lower end of the milk admission tube.

5. In combination with a distributing tube for centrifugal separators, the said tube being provided with a plurality of longitudinally arranged discharge openings in the wall thereof, a milk admission tube extending downwardly into the distributing tube, and a plurality of distributing blades projecting into the interior of the distributing tube from the wall thereof, the upper ends of all of said blades being positioned above the lower end of the milk admission tube, and said blades increasing in width from the tops to the bottoms thereof to present inclined free edges.

6. In combination with a distributing tube for centrifugal separators, said tube being provided with a discharge opening, a distributing blade extending inwardly from the wall of the distributing tube, said blade increasing in width from the top to the bottom thereof.

7. The combination with a distributing tube for centrifugal separators, said tube being provided with a discharge opening, a distributing blade extending inwardly from the wall of the distributing tube, said blade being provided with an outwardly inclined free edge, the upper portion of which extends in close proximity to the inner wall of the distributing tube.

8. In combination with a distributing tube for centrifugal separators, having a discharge opening in the side thereof, a distributing blade extending longitudinally of the distributing tube and inwardly from the wall thereof, said blade increasing in width from its top to its bottom, and the inclined free edge of said blade being curved outwardly.

9. In combination with a rotatable distributing tube for centrifugal separators, said tube being provided with a lateral discharge opening, means for feeding a stream of milk downwardly into the distributing tube, and means carried by the distributing tube positioned to engage the stream of milk fed into the tube and to remove a film of milk from said stream upon rotation of the tube.

10. The method of securing a uniform longitudinal distribution of milk in cream separators consisting in feeding a stream of milk into the rotating distributing tube of a separator, removing the milk from the descending stream in the form of a thin film without shattering said stream, and feeding the milk thus removed through the outlet of the distributing tube.

11. In combination with a distributing tube for centrifugal separators having an outlet opening in the side thereof, a milk admission tube extending downwardly into the upper portion of said distributing tube, a distributing blade extending inwardly from the wall of the distributing tube and provided with an inclined free edge, the upper portion of which is positioned outside of the milk admission tube and the lower portion of which underlies the discharge end of the milk admission tube.

In testimony whereof, we affix our signatures in presence of two witnesses.

JAMES W. WILFORD.
CLARK C. WOOD.

Witnesses:
HARRIET L. LAWRENCE,
E. G. SCHULTZ.

---

Copies of this patent may be obtained for five cents each, by addressing the "Commissioner of Patents, Washington, D. C."